US008355056B2

(12) United States Patent
Tanaka

(10) Patent No.: US 8,355,056 B2
(45) Date of Patent: Jan. 15, 2013

(54) IMAGE PROCESSING DEVICE, IMAGING DEVICE, AND IMAGE PROCESSING PROGRAM

(75) Inventor: Mikiya Tanaka, Chigasaki (JP)

(73) Assignee: Nikon Corporation, Tokyo (JP)

( * ) Notice: Subject to any disclaimer, the term of this patent is extended or adjusted under 35 U.S.C. 154(b) by 28 days.

(21) Appl. No.: 12/860,325

(22) Filed: Aug. 20, 2010

(65) Prior Publication Data

US 2011/0043656 A1    Feb. 24, 2011

(30) Foreign Application Priority Data

Aug. 24, 2009   (JP) ................. 2009-192946

(51) Int. Cl.
    *H04N 5/228*   (2006.01)
(52) U.S. Cl. .................................. 348/222.1
(58) Field of Classification Search ............ 382/159, 382/106; 348/222.1
    See application file for complete search history.

(56) References Cited

U.S. PATENT DOCUMENTS

| 7,035,467 B2 | 4/2006 | Nicponski | |
| 2007/0196013 A1* | 8/2007 | Li et al. ................. | 382/159 |

FOREIGN PATENT DOCUMENTS

| JP | A-10-232934 | 9/1998 |
| JP | A-2002-216131 | 8/2002 |
| JP | A-2005-173932 | 6/2005 |
| JP | A-2008-204091 | 9/2008 |

OTHER PUBLICATIONS

Office Action issued in Japanese Patent Application No. 2009-192946 dated May 31, 2011 (with translation).
Office Action issued in Japanese Patent Application No. 2009-192946 dated Oct. 4, 2011 (with translation).

* cited by examiner

*Primary Examiner* — Aung S Moe
(74) *Attorney, Agent, or Firm* — Oliff & Berridge, PLC

(57) ABSTRACT

An image processing device includes: an input unit that inputs an image obtained by imaging; a resize processing unit that performs one of enlargement and reduction processing for the image input by the input unit as a category decision target image, so as to obtain a first image equivalent of a predetermined camera-to-subject distance; a feature amount calculation unit that calculates a first feature amount that indicates a feature of the first image resized by the resize processing unit; and a decision unit that makes a category decision on the category decision target image based upon the first feature amount, the category decision being to make a decision as to which of a plurality of categories the category target image corresponds to.

8 Claims, 8 Drawing Sheets

| CATEGORY | CAMERA-TO-SUBJECT DISTANCE (cm) | MINIMUM SIZE OF CATEGORY IMAGE |
|---|---|---|
| FLOWER (CLOSE-UP) | 100 | 120 × 120 |
| FLOWER (NORMAL) | 500 | 120 × 120 |
| INSECT | 100 | 120 × 120 |
| DOG | 1000 | 120 × 120 |
| . | | |
| . | | |

FIG.5

| CATEGORY | CAMERA-TO-SUBJECT DISTANCE (cm) | MINIMUM SIZE OF CATEGORY IMAGE |
|---|---|---|
| FLOWER (CLOSE-UP) | 100 | 120 × 120 |
| FLOWER (NORMAL) | 500 | 120 × 120 |
| INSECT | 100 | 120 × 120 |
| DOG | 1000 | 120 × 120 |
| . | | |
| . | | |

IMAGE PROCESSING DEVICE, IMAGING DEVICE, AND IMAGE PROCESSING PROGRAM

INCORPORATION BY REFERENCE

The disclosures of the following priority applications is herein incorporated by reference:

Japanese Patent Application No. 2009-192946 filed Aug. 24, 2009.

BACKGROUND OF THE INVENTION

1. Field of the Invention

The present invention relates to an image processing device, an imaging device, and an image processing program.

2. Description of Related Art

U.S. Pat. No. 7,035,467 discloses an art for discriminating a semantic classification (for example, a shooting scene) of each image based upon a feature amount of the image.

SUMMARY OF THE INVENTION

In general, sample image data is categorized by a classifier such as an SVM (Support Vector Machine) method, which uses a feature amount of the image. The composition of sample images varies according to photographers, and hence a difference in composition may result in a different feature amount calculated even from images of the same subject. In this case, there is a problem of deterioration in discrimination accuracy of an image for which the classifier is used.

According to the first aspect of the present invention, an image processing device comprises: an input unit that inputs an image obtained by imaging; a resize processing unit that performs one of enlargement and reduction processing for the image input by the input unit as a category decision target image, so as to obtain a first image equivalent of a predetermined camera-to-subject distance; a feature amount calculation unit that calculates a first feature amount that indicates a feature of the first image resized by the resize processing unit; and a decision unit that makes a category decision on the category decision target image based upon the first feature amount, the category decision being to make a decision as to which of a plurality of categories the category target image corresponds to.

According to the second aspect of the present invention, it is preferred that the resize processing unit of the image processing device according to the first aspect further performs one of enlargement and reduction processing for the image input by the input unit as a sample image, so as to obtain a second image equivalent of a predetermined camera-to-subject distance; and the feature amount calculation unit further calculates a second feature amount that indicates a feature of the second image resized by the resize processing unit, and the image processing device further comprises: a classifier generation unit that generates a classifier for the category decision based upon the second feature amount.

According to the third aspect of the present invention, the decision unit of the image processing device according to the second aspect may make the category decision on the category decision target image by comparing the classifier with the first feature amount.

According to the fourth aspect of the present invention, the resize processing unit of the image processing device according to the first aspect may perform one of the enlargement and reduction processing corresponding to a camera-to-subject distance predetermined for each category.

According to the fifth aspect of the present invention, it is preferred that in the image processing device according to the first aspect, when carrying out the enlargement processing for the category decision target image, the resize processing unit obtains the first image by using an image of a predetermined range including a focus control area among the category decision target images.

According to the sixth aspect of the present invention, an imaging device comprises: an image generation unit that captures an image of a subject so as to generate an image; a resize processing unit that performs one of enlargement and reduction processing for the image generated by the image generation unit as a category decision target image, so as to obtain a first image equivalent of a predetermined camera-to-subject distance; a feature amount calculation unit that calculates a first feature amount that indicates a feature of the first image resized by the resize processing unit; and a decision unit that makes a category decision on the category decision target image based upon the first feature amount, the category decision being to make a decision as to which of a plurality of categories the category decision image corresponds to.

According to the seventh aspect of the present invention, a computer-readable program product that includes a computer-executable image processing program, and the image processing program causes a computer to execute: input processing for inputting an image obtained by imaging; resize processing for performing one of enlargement and reduction processing for the image input by the input processing as a category decision target image, so as to obtain a first image equivalent of a predetermined camera-to-subject distance; feature amount calculation processing for calculating a feature amount of the first image resized by the resize processing; and decision processing for making a category decision on the category decision target image based upon a feature amount of the first image, the category decision being to make a decision as to which of a plurality of categories the category decision target image corresponds to.

BRIEF DESCRIPTION OF THE DRAWING

FIG. 5 is a figure showing an example of the relationship among a category, a camera-to-subject distance, and a minimum size of an image.

DESCRIPTION OF PREFERRED EMBODIMENTS

Figure 1:
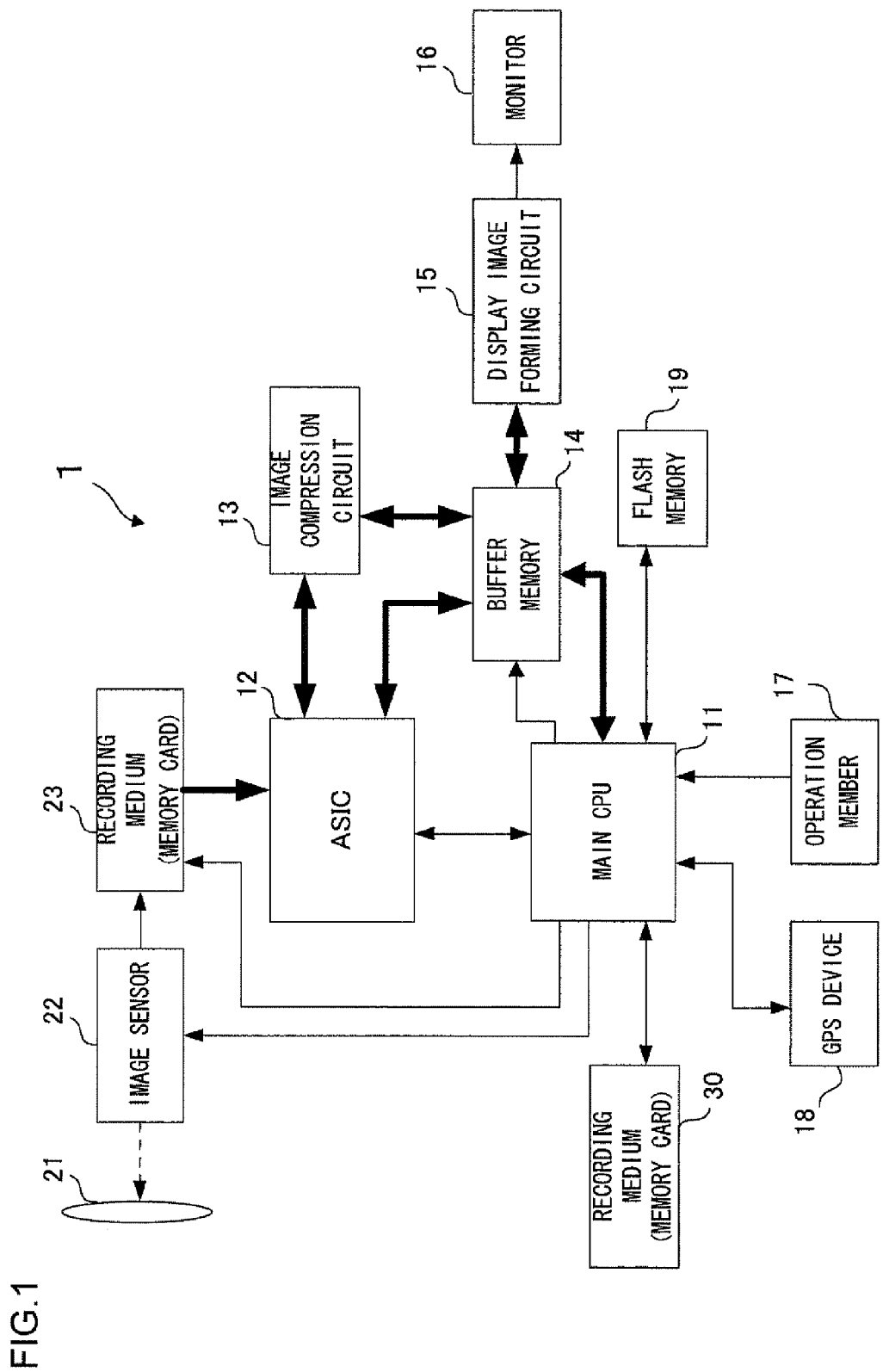
FIG. 1 is a block diagram explaining the structure of a main section of an electronic camera according to an embodiment of the present invention.

An embodiment of the present invention will now be explained with reference to the drawings. FIG. 1 is a block diagram explaining the structure of the main section of an electronic camera 1 according to an embodiment of the present invention. The electronic camera 1 is controlled by a main CPU 11.

A photographic lens 21 causes a subject image to be formed on an imaging plane of an image sensor 22. The image sensor 22, being constituted with a CCD image sensor and the like, captures the subject image on the imaging plane, and outputs an imaging signal to an imaging circuit 23. Color filters of R (red), G (green), and B (blue) are provided on the imaging plane of the image sensor 22 so that each of the color filters corresponds to a pixel location. Since the image sensor 22 captures the subject image through the color filters, a photoelectric conversion signal output from the image sensor 22 includes color information in RGB color system.

The imaging circuit 23 performs analog processing (gain control and the like) for the photoelectric conversion signal output from the image sensor 22 and converts an analog imaging signal into digital data through a A/D conversion circuit.

The main CPU 11 inputs a signal output from each block, carries out a predetermined calculation, and outputs a control signal based upon the calculation result to each of the blocks. An image processing circuit 12, being configured, for instance, as an ASIC (application specific integrated circuit), performs image processing for a digital image signal input from the imaging circuit 23. The image processing includes, for example, edge enhancement, color temperature adjustment (white balance adjustment) processing, and format conversion processing for the image signal.

An image compression circuit 13 performs image compression processing at a predetermined compression ratio, for instance, in JPEG format for the image signal that has undergone the processing performed by the image processing circuit 12. A display image forming circuit 15 forms display data so as to cause an LCD monitor 16 to display a captured image.

A buffer memory 14 is used so as to temporarily store data before and after image processing and during image processing, store an image file before being recorded in a recording medium 30, and store an image file having been read out from the recording medium 30.

The recording medium 30 is constituted with a memory card or the like that can be attached to and detached from the electronic camera 1. In response to an instruction from the main CPU 11, data of a captured image and an image file containing information thereof are recorded in the recording medium 30. The image file recorded in the recording medium 30 can be read out in response to an instruction from the main CPU 11.

A program to be executed by the main CPU 11, data necessary for processing performed by the main CPU 11, and the like are stored in a flash memory 19. It is arranged that the contents of the program and the data stored in the flash memory 19 can be added and modified in response to an instruction from the main CPU 11.

Operation member 17, including a variety of buttons and switches of the electronic camera 1, outputs operation signals to the main CPU 11 in response to the operation contents of each of the operation members such as a depression operation of a release button and a switching operation of a mode changeover switch.

In response to an instruction from the main CPU 11, a GPS device 18 receives radio waves from a GPS satellite and outputs a received signal to the main CPU 11. Based upon the received signal from the GPS device 18, the main CPU 11 performs a predetermined operation so as to detect positioning information (latitude, longitude, and altitude) of the electronic camera 1.

The electronic camera 1 is configured to perform predetermined image processing and compression processing for an image signal obtained by the image sensor 22 during photographing and to generate an image file in which additional information including positioning information, information related to the captured image, and the like is added to the image data that has undergone the compression processing. More specifically, image data in JPEG format is stored in an image data unit and an image file in Exif format in which the additional information is stored in an additional information unit is generated. The image file in Exif format is an image file in which a thumbnail image and additional information data are embedded in image data in JPEG image format. The generated image file is stored in the recording medium 30.

In addition, the electronic camera 1 is configured so that a shooting mode and a reproduction mode can be switched. The shooting mode is an operation mode to capture a subject image and save data of the captured image in the recording medium 30 as an image file. The reproduction mode is a mode to cause the LCD monitor 16 to display a reproduction image based upon the image data by reading out the captured image data from the recording medium 30 or the like.

<Category Decision on Captured Image>

The electronic camera 1 of the present embodiment includes a function to group captured images. More specifically, the electronic camera 1 makes a category decision on an image file recorded in the recording medium 30 and stores the image file on which the decision has been made into a folder provided for each category. It is to be noted that the electronic camera 1 may be configured to create a control table of an image file and store category information for the image file in the table, in place of storing the image file in the folder provided for each category.

Figure 2:
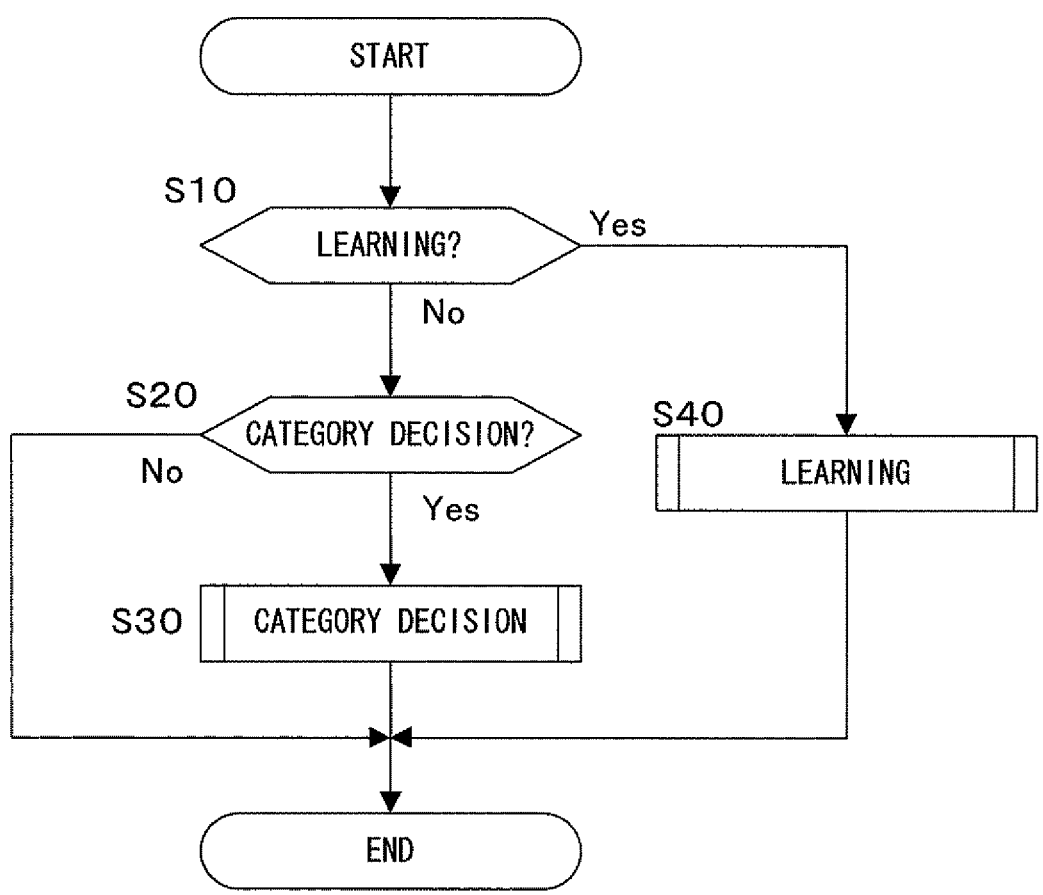
FIG. 2 is a flowchart explaining the flow of the category decision processing executed by a main CPU.

FIG. 2 is a flowchart explaining the flow of the category decision processing executed by the main CPU 11. Upon input of an operation signal instructing execution of the category decision processing from the operation members 17, the main CPU 11 starts the processing according to FIG. 2.

In a step S10 of FIG. 2, the main CPU 11 makes a decision as to whether or not to perform learning. When an instruction for learning is input from the operation members 17, the main CPU 11 makes a positive decision in the step S10 and causes the flow of control to proceed to a step S40. When the instruction for learning is not input from the operation members 17, the main CPU 11 makes a negative decision in the step S10 and causes the flow of control to proceed to a step S20.

In the step S20, the main CPU 11 makes a decision as to whether or not to make a category decision. When an instruction for making a category decision is input from the operation members 17, the main CPU 11 makes a positive decision in the step S20 and causes the flow of control to proceed to a step S30. When the instruction for making a category decision is not input from the operation members 17, the main CPU 11 makes a negative decision in the step S20 and terminates the processing according to FIG. 2.

In the step S30, the main CPU 11 performs the category decision processing and terminates the processing according to FIG. 2. The category decision processing will be described later in detail. In the step S40, to which the flow of control proceeds after a negative decision is made in the step S10 described above, the main CPU 11 performs learning processing and terminates the processing according to FIG. 2. The learning processing will be described later in detail.

<Category Decision Processing>

The category decision processing (S30) for an image will now be explained in detail with reference to the flowchart shown as an example in FIG. 3. The main CPU 11 reads out from the recording medium 30, for instance, data of an image file (decision target image) for which the category decision is intended and extracts it on the buffer memory 14 so as to start the processing according to FIG. 3. In a step S31 of FIG. 3, the main CPU 11 selects a category classifier as well as obtains information indicating a corresponding category camera-to-subject distance and causes the flow of control to proceed to a step S32.

The selection of a category classifier refers to a serial selection by the main CPU 11 of category classifiers that are included in advance. As the order of selection, the main CPU 11, for example, first selects a classifier that corresponds to a category in which a larger number of images are grouped. The information indicating a category camera-to-subject distance is information that indicates a camera-to-subject distance determined for each category in advance. FIG. 5 is a figure showing an example of the relationship between a category and a camera-to-subject distance. For instance, the camera-to-subject distance in the case of a category "Flower (close-up)" is 100 cm, that of a category "Flower (Normal)" is 500 cm, that of a category "Insect" is 100 cm, and that of a category "Dog" is 1000 cm. The information indicating category classifiers (category classifier information) and the information indicating category camera-to-subject distances (category camera-to-subject distance information) are recorded in the flash memory 19.

In the step S32, the main CPU 11 performs resize processing for the decision target image extracted on the buffer memory 14. More specifically, based upon the category camera-to-subject distance (for example, the camera-to-subject distance of 100 cm in the case of the category "Flower (close-up)") obtained in the step S31, the main CPU 11 performs the resize processing for the decision target image, equalizes the composition of the decision target image, and causes the flow of control to proceed to a step S33. If the decision target image is equivalent of a close-up photograph (the camera-to-subject distance is less than 100 cm in the above example), the resize processing is equivalent of reduction processing of the image. If the decision target image is equivalent of a wide-angle photograph (the camera-to-subject distance is greater than 100 cm in the above example), the resize processing corresponds to enlargement processing of a part of the image.

As the part of the image described above, the main CPU 11 designates, for instance, a predetermined range around focus area (region used to obtain focus control information within a photographic screen) applied at the time of photography. It is to be noted that if the focus control information is obtained in each of a plurality of focus control regions in the photographic screen, the main CPU 11 may designate a predetermined range around a region corresponding to the closest subject as the part of the image.

In the step S33, the main CPU 11 makes a decision as to whether or not the resized image is larger than the original image. When the resized image is larger than the original image, the main CPU 11 makes a positive decision in the step S33 and causes the flow of control to proceed to a step S39. When the resized image is not larger than the original image, the main CPU 11 makes a negative decision in the step S33 and causes the flow of control to proceed to a step S34.

In the step S39, the main CPU 11 crops the resized image in the size of the original image and causes the flow of control to proceed to the step S34.

In the step S34, the main CPU 11 reduces the resized (or cropped) image to the minimum size of category image and causes the flow of control to proceed to a step S35. As reduction processing, the main CPU 11 performs, for example, simple processing of calculating an average of a predetermined number of pieces of neighboring pixel data and designating it as one piece of pixel data. The minimum size of category image is defined for each category in advance and recorded in the flash memory 19. In the present embodiment, the minimum size of category image is 120×120 pixels each. An example of the relationship between the category and the minimum size of image is also shown in FIG. 5.

In the step S35, the main CPU 11 calculates a feature amount from the image that has undergone the reduction processing. The feature amount calculated by the main CPU 11 corresponds to the category classifier selected in the step S31. The relationship between the category and the feature amount to be calculated is tabled in advance and recorded in the flash memory 19. The feature amount is, for instance, color information, sharpness information, texture information, pattern information, brightness information, and the like, which are calculated based upon pixel data constituting a predetermined region of the image. In addition, the size of the image and information on a color histogram may be treated as the feature amount. Since the feature amount calculation is a publicly known technique, detailed descriptions related to the feature amount calculation will be curtailed in the present explanation.

In a step S36, the main CPU 11 uses the category classifier selected in the step S31 so as to calculate the probability (score) of being the category and causes the flow of control to proceed to a step S37. The score of probability of being a category corresponds to the distance between the boundary that separates a space in a feature amount space represented by the corresponding category classifier (for instance, the boundary between "Flower (close-up)" region and "Non-Flower (close-up)" region) and the feature amount calculated in the step S35. The score of probability of being "Flower (close-up)" is high if a feature amount calculated from an image meets the following criteria (1) and (2) for example.
(1) The calculated feature amount is located at the back of the feature amount region corresponding to "Flower (close-up)" in the feature amount space represented by the category classifier for "Flower (close-up)".
(2) The distance from the calculated feature amount to the feature amount region corresponding to "Non-Flower (close-up)" is long.

On the other hand, the score of probability of being "Flower (close-up)" is low if the feature amount calculated from the image meets the following criteria (3) and (4).
(3) The calculated feature amount is located at the edge of the feature amount region corresponding to "Flower (close-up)".
(4) The distance from the calculated feature amount to the feature amount region corresponding to "Non-Flower (close-up)" is short.

The main CPU 11 calculates the score according to the above distance.

In the step S37, the main CPU 11 makes a decision as to whether or not all the category classifiers prepared advance are selected and the processing has terminated. If the main CPU 11 has used all the category classifiers in series so as to perform feature amount calculation and the category probability (score) P calculation, the main CPU 11 makes a positive decision in the step S37 and causes the flow of control to proceed to a step S38. If the main CPU 11 has not used all the category classifiers in series so as to perform feature amount calculation and category probability (score) P calculation, the main CPU 11 makes a negative decision in the step S37 and causes the flow of control to return to the step S31. When the flow of control returns to the step S31, the main CPU 11 selects another category classifier and obtains information indicating the category camera-to-subject distance corresponding thereto, so that the main CPU 11 repeats the processing described above.

Figure 3:
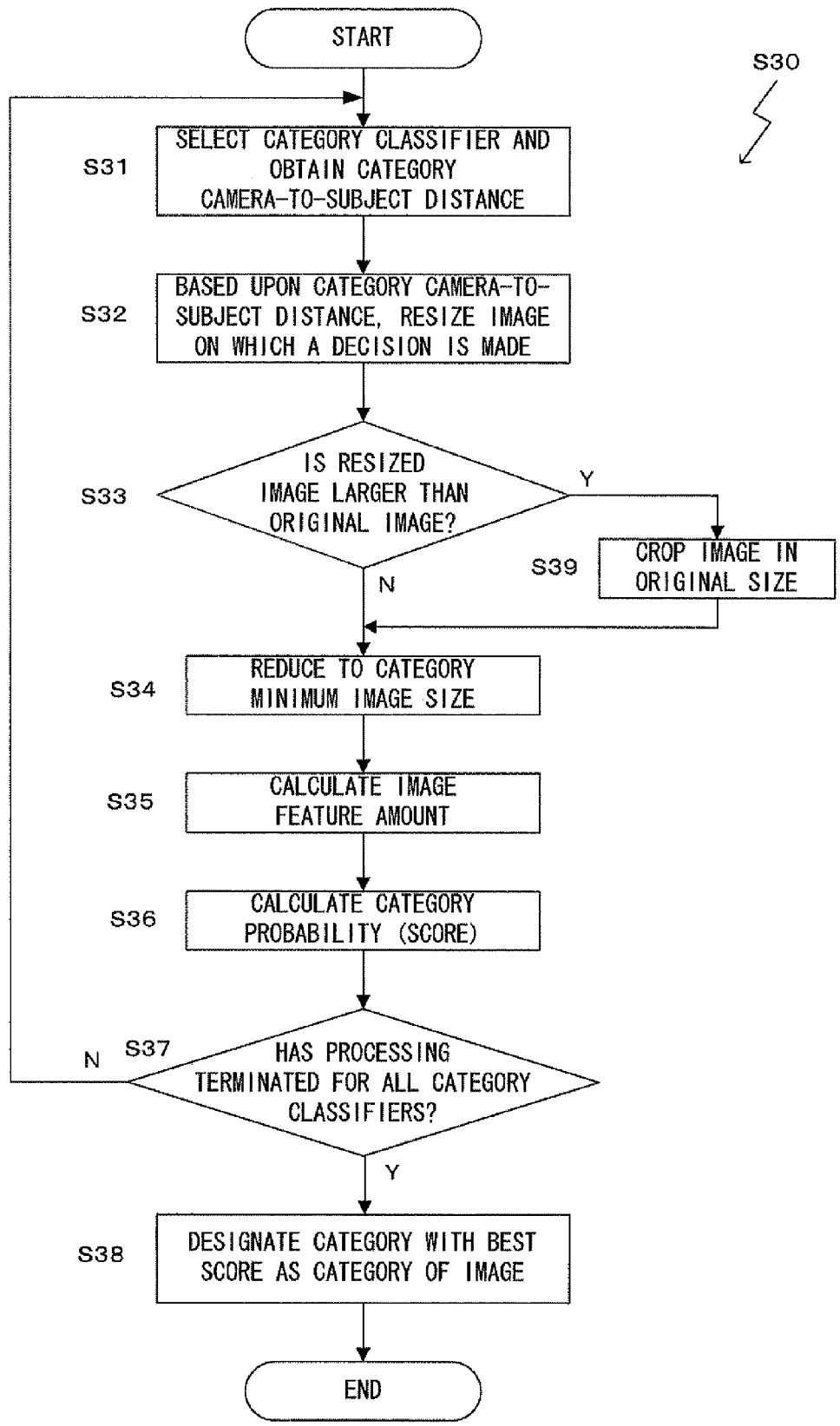
FIG. 3 is a flowchart explaining the category decision processing in detail.

In the step S38, the main CPU 11 makes a decision that the decision target image corresponds to a category corresponding to the category classifier corresponding to the best score and terminates the processing according to FIG. 3.

<Learning Processing>

The main CPU 11 obtains the category classifier described above through learning based upon sample image (image for learning) data. The learning processing (S40) will now be explained in detail with reference to the example of flowchart shown in FIG. 4. The main CPU 11 inputs information indicating storage location (for example, memory address) of an image for learning and the category of the image for learning so as to start the processing according to FIG. 4.

Figure 4:
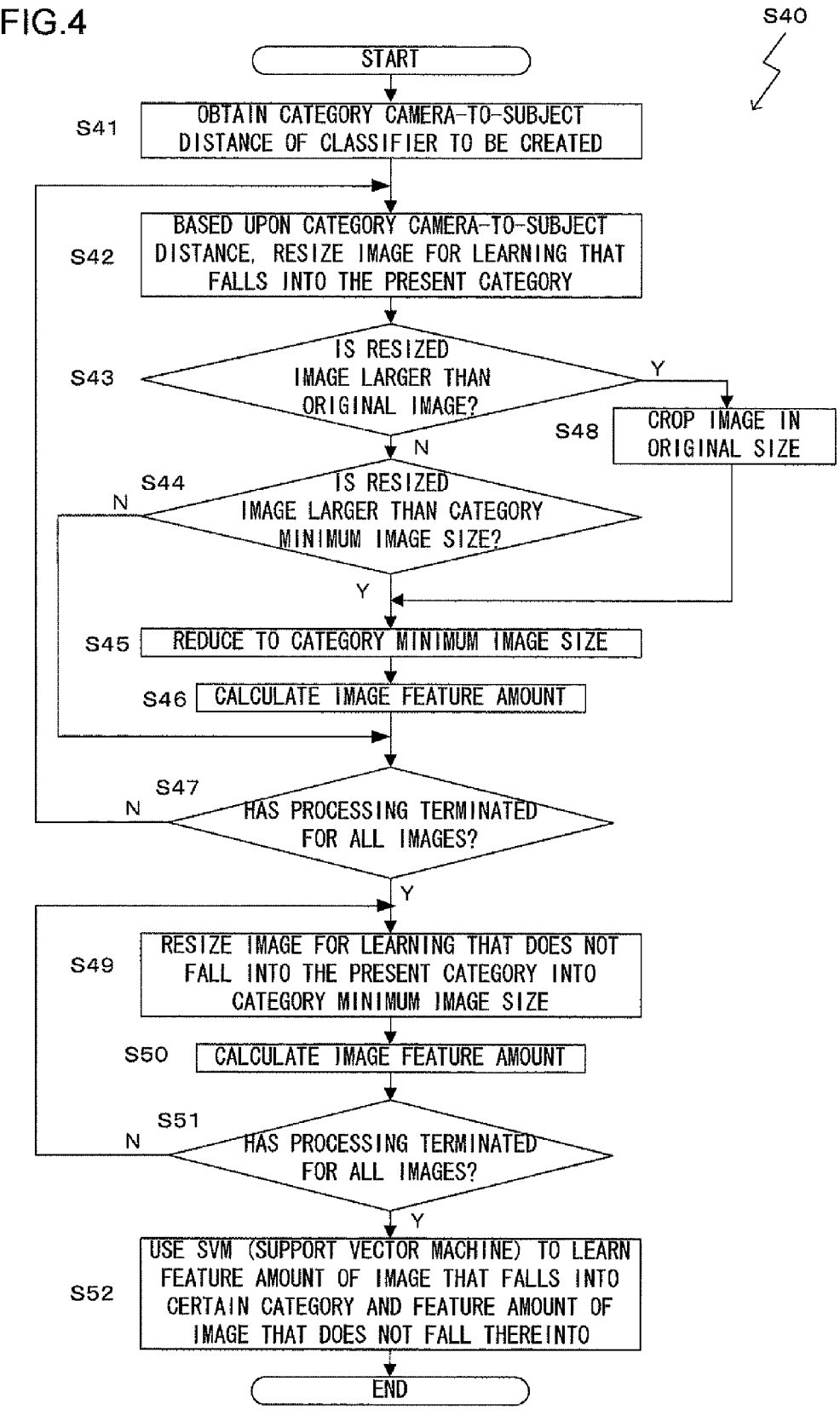
FIG. 4 is a flowchart explaining the learning processing in detail.

In a step S41 of FIG. 4, the main CPU 11 obtains category camera-to-subject distance information that corresponds to a predetermined category and causes the flow of control to proceed to a step S42. The main CPU 11 gives priority to, for instance, the camera-to-subject distance information that corresponds to a category with a larger number of the calculated feature amount when obtaining the category camera-to-subject distance information.

The category camera-to-subject distance information is, as described above, recorded in the flash memory 19 in advance.

In the step S42, the main CPU 11 reads out from the recording medium 30 data of an image file for learning that corresponds to the category for which the category camera-to-subject distance information is obtained among images for learning and extracts it on the buffer memory 14. The main CPU 11 then performs the resize processing for the extracted image for learning and causes the flow of control to proceed to a step S43. The main CPU 11 performs the same resize processing as that in the step S32 of FIG. 3 so as to equalize the composition of the image for learning.

In the step S43, the main CPU 11 makes a decision as to whether or not the resized image is larger than the original image. When the resized image is larger than the original image, the main CPU 11 makes a positive decision in the step S43 and causes the flow of control to proceed to a step S48. When the resized image is not larger than the original image, the main CPU 11 makes a negative decision in the step S43 and causes the flow of control to proceed to a step S44.

In the step S48, the main CPU 11 crops the resized image in the size of the original image and causes the flow of control to proceed to a step S45.

In the step S44, the main CPU 11 makes a decision as to whether or not the resized image is larger than the minimum size of category image. The minimum size of category image is, as described above, is 120×120 pixels for each category. When the resized image is larger than the minimum size of category image, the main CPU 11 makes a positive decision in the step S44 and causes the flow of control to proceed to the step S45. When the resized image is not larger than the minimum size of category image, the main CPU 11 makes a negative decision in the step S44 causes the flow of control to proceed to a step S47. If the flow of control proceeds to the step S47, the main CPU 11 excludes the resized image from the target of the feature amount calculation because the resized image is too small to be appropriate for the feature amount calculation (lacking in necessary information).

In the step S45, the main CPU 11 reduces the resized (or cropped) image to the minimum size of category image and causes the flow of control to proceed to a step S46. As reduction processing, the main CPU 11 performs, for example, simple processing of calculating an average of a predetermined number of pieces of neighboring pixel data and designating it as one piece of pixel data.

In the step S46, the main CPU 11 calculates a feature amount from the image that has undergone the reduction processing. The feature amount calculated by the main CPU 11 corresponds to the category classifier that corresponds to the image, and the main CPU 11 performs the same processing as that in the step S35 of FIG. 3.

In the step S47, the main CPU 11 makes a decision as to whether or not the feature amount has been calculated for all the images for learning extracted on the buffer memory 14. If the main CPU 11 has calculated the feature amount of all the images for learning (except those excluded by making a negative decision in the step S44), the main CPU 11 makes a positive decision in the step S47 and causes the flow of control to proceed to a step S49. If the main CPU 11 has not calculated the feature amount of all the images for learning, the main CPU 11 makes a negative decision in the step S47 and causes the flow of control to return to the step S42. When the flow of control returns to the step S42, the main CPU 11 repeats the processing described above for another image for learning.

In the step S49, the main CPU 11 obtains category camera-to-subject distance information that corresponds to another category, reads out from the recording medium 30 data of the image file for learning corresponding to the category for which the category camera-to-subject distance information is obtained, and extracts it on the buffer memory 14. In addition, the main CPU 11 performs the resize processing for the extracted image for learning and causes the flow of control to proceed to a step S50. The main CPU 11 performs the same resize processing as that in the step S42 so as to equalize the composition of the image for learning.

In the step S50, the main CPU 11 calculates a feature amount from the image that has undergone the resize processing. The feature amount calculated by the main CPU 11 corresponds to the category classifier that corresponds to the image, and the main CPU 11 performs the same processing as that in the step S46.

In a step S51, the main CPU 11 makes a decision as to whether or not the feature amount has been calculated for all the images for learning extracted on the buffer memory 14. If the main CPU 11 has calculated the feature amount of all the images for learning, the main CPU 11 makes a positive decision the step S51 and causes the flow of control to proceed to a step S52. If the main CPU 11 has not calculated the feature amount of all the images for learning, the main CPU 11 makes a negative decision in the step S51 and causes the flow of control to return to the step S49. When the flow of control returns the step S49, the main CPU 11 repeats the processing described above for another image for learning.

In the step S52, the main CPU 11 uses an SVM (Support Vector Machine) method so as to learn the feature amount of an image that corresponds to a category and the feature amount of an image that does not correspond to the category, stores the results in the flash memory 19, and then terminates the processing according to FIG. 4.

The following operations and advantageous effects can be achieved according to the embodiment explained above.

(1) Since it is arranged that the main CPU 11 of the electronic camera 1 performs the enlargement or reduction processing for a category decision target image so as to obtain a first image equivalent of a predetermined camera-to-subject distance, calculates the feature amount of the first image, which has been changed in composition, i.e., resized, and makes a category decision on the category decision target image based upon the calculated feature amount of the first image. As a result, the main CPU 11 applies a predetermined composition to the category decision target image before calculating the feature amount.

Figure 7:
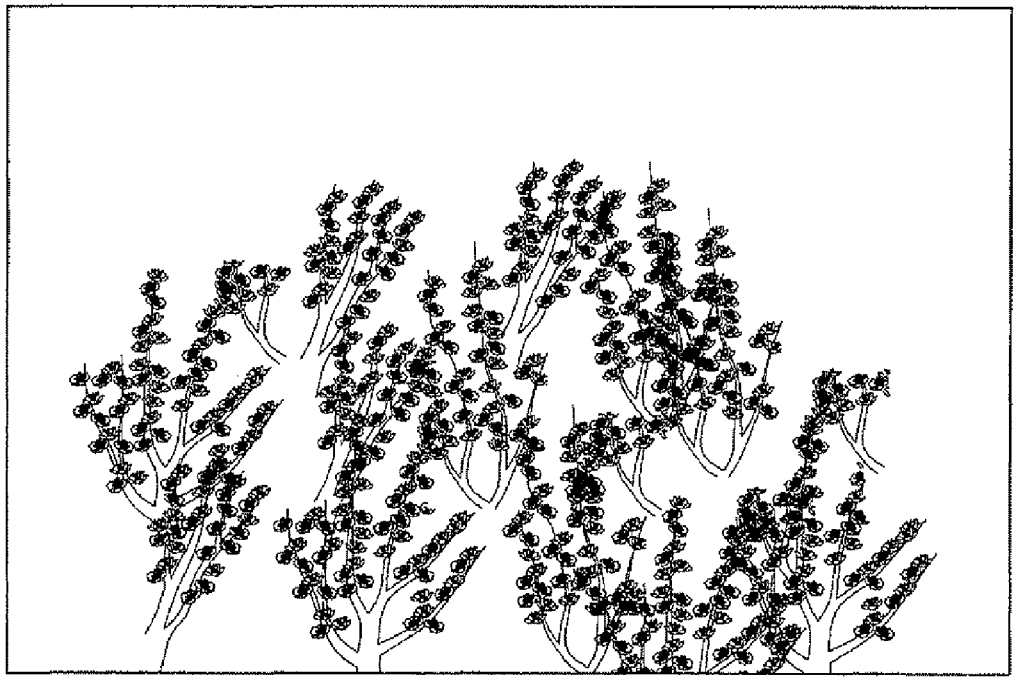
FIG. 7 is a figure explaining the difference in a camera-to-subject distance.
Figure 8:
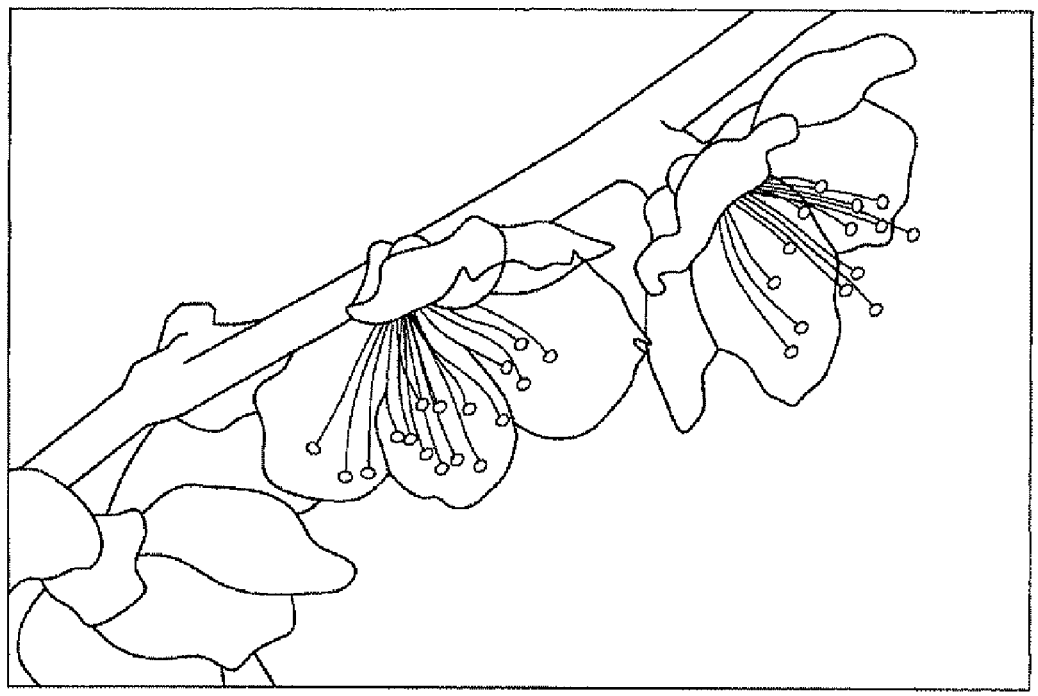
FIG. 8 is a figure explaining the difference in a camera-to-subject distance.

FIG. 7 and FIG. 8 are figures explaining the difference in a composition (camera-to-subject distance), each of which is an image of "Cherry Blossoms". Although both are images of the same "Cherry Blossoms", the feature amounts calculated from the original images will be significantly different between the both images. Then, the main CPU 11 changes (resizes) the composition of the both images so that it corresponds to a predetermined camera-to-subject distance, and then calculates the feature amounts, thereby making the feature amounts of the both images more similar than those without the changed (resized) composition. As a result, the category discrimination accuracy of the image is improved. In particular, it is effective when the composition of category decision target images is not equalized.

(2) Since it is arranged that the main CPU 11 further performs the enlargement or reduction processing for a sample image so as to obtain a second image equivalent of a predetermined camera-to-subject distance, calculates the feature amount of the second image, and generates a classifier for category decision based upon the feature amount of the second image. As a result, an appropriate classifier can be generated even if the composition of the sample image is not equalized.

(3) Since in addition the main CPU 11 makes a category decision on the category decision target image by comparing the classifier with the feature amount of the first image, the category discrimination accuracy of the image is improved. In particular, it is effective when the composition of the sample image and that of the category decision target image are not equalized.

(4) It is arranged that the main CPU 11 further performs the enlargement or reduction processing corresponding to the camera-to-subject distance predetermined for each category. As a result, even the category of the same "Flower" can be subdivided into "Flower" photographed in close-up and "Flower" photographed normally (not in close-up).

(5) Since it is arranged that an image of a predetermined range including a focus control area is obtained upon the enlargement processing for composition change (resize), the probability of including the main subject after the composition change (resize) can be increased.

(Variation 1)

While the above explanation has given an example of grouping images in the electronic camera 1, it may be arranged that images are grouped by an electronic device such as a photo frame and a photo viewer in place of the electronic camera 1.

(Variation 2)

Depending upon a category, the range of focal length at the time of photography may be substantially determined (common in many images). For instance, close-up photography and distant landscape photography are more likely to be so. It may then be arranged that in the case of those categories, the composition change (resize) processing is carried out using information of focal length of the photographic lens in place of the camera-to-subject distance or together with the camera-to-subject distance.

(Variation 3)

Figure 6:
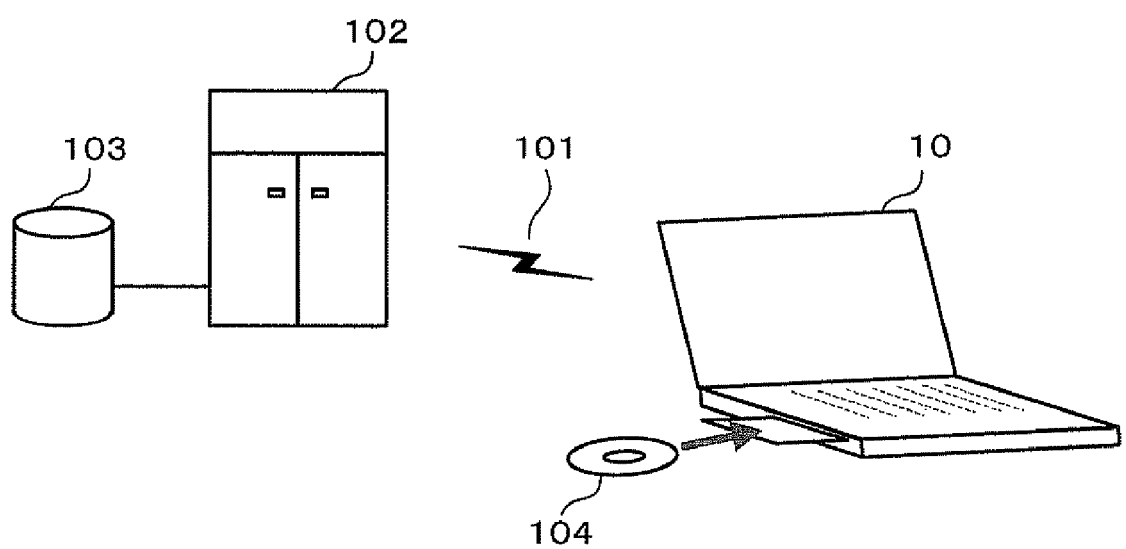
FIG. 6 is a figure showing an example of a computer device.

The image processing device may be configured to cause a computer device 10 shown in FIG. 6 to execute an image processing program that performs the processing according to FIG. 2 to FIG. 4. In this case, through an external interface, the computer device inputs an image captured by the electronic camera 1 and stored in the recording medium 30. When the image processing program loaded onto the personal computer 10 is used, the program is loaded into a data storage device of the personal computer 10 and then the program is run, so that the personal computer 10 is used as an image processing device that groups images that have been input.

The program may be loaded onto the personal computer 10 by putting a recording medium 104 such as a CD-ROM in which the program is stored into the personal computer 10 or may be loaded onto the personal computer 10 via a communication line 101 such as a network. When the program is loaded via the communication line 101, the program is stored in a hard disk device 103 or the like of a server (computer) 102 connected to the communication line 101. The image processing program can be provided as computer program products in a variety of forms such as provision through the recording medium 104 or the communication line 101 or the like.

The above described embodiments are examples, and various modifications can be made without departing from the scope of the invention.

What is claimed is:

1. An image processing device, comprising:
a recording unit in which a plurality of categories and information regarding camera-to-subject distances are recorded, the information regarding each of the camera-to-subject distances corresponding to each of the plurality of categories;
a resize processing unit that performs one of enlargement and reduction processing for a category decision target image based upon the information regarding the camera-to-subject distances corresponding to each of the plurality of categories, so as to obtain a plurality of first images based upon the resized category decision target image;
a feature amount calculation unit that calculates a plurality of first feature amounts each of which indicates a feature of the first image obtained by the resize processing unit respectively; and
a decision unit that makes a category decision on the category decision target image based upon the first feature amount, the category decision being to make a decision as to which of the plurality of categories the category target image corresponds to.

2. An image processing device according to claim 1, wherein:
the resize processing unit further performs one of enlargement and reduction processing for a sample image, so as to obtain a second image based upon the resized sample image, the second image being equivalent of a predetermined camera-to-subject distance; and
the feature amount calculation unit further calculates a second feature amount that indicates a feature of the second image obtained by the resize processing unit, further comprising:
a classifier generation unit that generates a classifier for the category decision based upon the second feature amount.

3. An image processing device according to claim 2, wherein:
the decision unit makes the category decision on the plurality of category decision target images by comparing the classifier with the first feature amount.

4. An image processing device according to claim 1, wherein:
when carrying out the enlargement processing for the category decision target image, the resize processing unit obtains the first image by using an image of a predetermined range including a focus control area among the category decision target images.

5. An image processing device according to claim 1, wherein:
a predetermined subject included in the category is recorded in the recording unit, corresponding to a plurality of camera-to-subject distances.

6. An image processing device according to claim 1, further comprising:
a reduction processing unit that reduces a size of the first image into a predetermined size.

7. An imaging device, comprising:
a recording unit in which a plurality of categories and information regarding camera-to-subject distances are recorded, the information regarding each of the camera-to-subject distances corresponding to each of the plurality of categories;
an image generation unit that captures an image of a subject so as to generate an image;
a resize processing unit that performs one of enlargement and reduction processing for the image generated by the image generation unit as a category decision target image based upon the information regarding the camera-to-subject distances corresponding to each of the plurality of categories, so as to obtain a plurality of first images based upon the resized category decision target mages;
a feature amount calculation unit that calculates a plurality of first feature amounts each of which indicates a feature of the first image obtained by the resize processing unit respectively; and
a decision unit that makes a category decision on the category decision target image based upon the first feature amount, the category decision being to make a decision as to which of the plurality of categories the category decision image corresponds to.

8. A non-transitory computer-readable program product that includes a computer-executable image processing program, wherein the image processing program causes a computer to execute:
a recording processing for recording a plurality of categories and information regarding camera-to-subject distances, the information regarding each of the camera-to-subject distances corresponding to each of the plurality of categories;
resize processing for performing one of enlargement and reduction processing for a category decision target image based upon the information regarding the camera-to-subject distances corresponding to each of the plurality of categories, so as to obtain a plurality of first images based upon the resized category decision target images;
feature amount calculation processing for calculating a plurality of feature amounts each of which indicates a feature of the first image obtained by the resize processing; and
decision processing for making a category decision on the category decision target image based upon a feature amount of the first image, the category decision being to make a decision as to which of the plurality of categories the category decision target image corresponds to.

* * * * *